United States Patent [19]

Sinsky

[11] 4,219,133
[45] Aug. 26, 1980

[54] STORAGE LEVEL MONITOR

[75] Inventor: John J. Sinsky, Milwaukee, Wis.

[73] Assignee: Intermountain Research and Development Corporation, Green River, Wyo.

[21] Appl. No.: 939,523

[22] Filed: Sep. 5, 1978

[51] Int. Cl.² ............................................. G01F 23/04
[52] U.S. Cl. ..................................... 222/39; 33/126.6; 222/56; 222/63; 340/617
[58] Field of Search ...................... 222/63, 64, 39, 56; 33/126.5, 126.6; 340/617

[56] References Cited

U.S. PATENT DOCUMENTS

| | | | |
|---|---|---|---|
| 2,381,505 | 8/1945 | Lindholm | 222/64 X |
| 3,140,610 | 7/1964 | Lanham | 33/126.6 |
| 3,400,462 | 9/1968 | Pobst | 33/126.6 |
| 3,500,546 | 3/1970 | Pilcher | 33/126.6 |
| 3,629,946 | 12/1971 | Parsons | 33/126.6 |
| 3,734,313 | 5/1973 | Gauthier et al. | 222/64 X |
| 3,742,307 | 6/1973 | Patsch | 33/126.6 |
| 3,838,518 | 10/1974 | Hendrickson | 33/126.6 |
| 3,909,948 | 10/1975 | Markfelt | 33/126.6 |

*Primary Examiner*—F. J. Bartuska
*Attorney, Agent, or Firm*—Edwin B. Cave; Frank Ianno

[57] ABSTRACT

The storage level of ore, supplied by an overhead loader to a bin or pile in the form of large, dense, hard fragments, up to a foot or more in diameter, is measured and controlled by repetitively lowering a line carrying a weight, having a mass at least as great as the largest ore fragments, from above the stored mass to the surface of the stored mass and measuring the distance traveled by the weight. Feed of ore is automatically stopped when maximum allowable level of stored mass is detected. Measurement of ore level is accomplished by counting, during the lowering of the weight, the pulses generated by a pulse generator operated by the turning of a winch upon which the line is reeled. The contact of the lowered weight with the stored ore mass is detected by the slowing of the rate of pulse generation as the weight ceases falling under the influence of gravity and the winch therefore ceases turning. Burial of the lowered weight so as to prevent its retrieval is detected when the time is exceeded for the full cycle of lowering and retraction of the weight. Such burial automatically disables the ore feed and the measuring device.

7 Claims, 5 Drawing Figures

STORAGE LEVEL MONITOR

This invention relates to devices for detecting the height of stored masses of mineral ores in order to balance the delivery of ore to and its withdrawal from the stored mass.

In the mining and processing of mineral ores, such as the trona ores of Wyoming, the mined ores are stored in bins or in open piles to await processing. Trona ore as mined occurs in dense, hard fragments of various sizes up to a foot or more in diameter and having weights of up to fifty pounds or more. The ore is ordinarily delivered more or less continuously to the upper part of the bin or to the top of the pile by means of a conveyor and is withdrawn from the bin or from the pile as needed for processing. To avoid excessive heights in the storage mass while assuring that there is an adequate supply of ore to provide uninterrupted operation of the processing, some means is necessary for monitoring the ore height so as to enable the rate of delivery to be controlled.

A variety of devices are known for detecting and monitoring the level of granular materials in storage bins where the individual grains are relatively small in size and weight compared with the massive ore fragments with which the devices of the present invention are required to deal. Among these known devices are optical and sonar gauging devices, electrical devices operating upon change in capacitance with changing levels of material and a variety of mechanical devices, some operating by repetitively lowering a weighted line to the surface of the stored material for repeated measurement of the distance between that surface and a more elevated datum point.

With the materials with which the present invention is concerned, however, the sheer size and weight of the falling ore fragments, which continually batter and weigh down any equipment within the storage region, and the dense dust generated by the dropping ore, have rendered ineffective or unsuitable the available designs of such prior known devices for detecting the level of stored material. Thus there has been no commercially available bin level controller capable of operating under these conditions.

The present invention is a depth probe for monitoring ore level under the difficult operating conditions referred to above and comprises means, supported at an upper level above the established maximum permitted ore level, for repeatedly lowering a weighted line from a datum point at that upper level until the weight reaches the surface of the stored ore and then retracting the weight to the datum point and means for measuring the distance traveled by the weight from the datum point to the ore surface. It has been found that satisfactory operation can be obtained with such a probing technique if the weight is given a mass substantially as great as, or greater than the largest ore fragments, if a line is used which is strong and durable enough to withstand the severe conditions of operation, if the motor means used for retracting the weight is powerful enough to raise the weight through moderate burial in ore, and if means are provided for detecting the situation where the weight is buried by the incoming ore to the point where it can no longer be freed by the available means for retraction.

Means are provided for generating a signal when the ore level reaches the maximum permitted height, and automatic means may also be provided for stopping the delivery of ore to the bin or pile until the ore level has receded adequately. Means may also be provided for generating a signal when the ore level becomes excessively low.

The measurement of the distance traveled by the weight is conveniently carried out by using a winch, to lower and raise the line, associated with a pulser which generates a number of successive pulses in proportion to the number of rotations of the winch, the pulses being counted by a counter which can be made to read directly in units of distance, such as feet or meters. The determination that the falling weight has reached the surface of the stored ore is conveniently made by detecting the resulting slowing of the pulse rate below that at which the pulses are normally generated by the rotation of the unrestrained winch under the pull of the falling weight while it is unsupported by the ore surface.

BRIEF DESCRIPTION OF THE DRAWINGS

Referring to FIG. 1, probe weight 101 is supported by line 102 which is wound on winch drum 201 (FIG. 2) contained in probe operating unit 103 mounted above bin 104, which contains ore mass 105 fed by conveyor 106. A probe weight of from 50 to 100 pounds (about 23 to about 45 kilograms) can conveniently be used, supported by a steel wire cable of a diameter conveniently from ⅛ inch to 3/16 inch (about 0.32 cm. to 0.48 cm.). Logic control unit 107 controls the operation of the probe operating unit and, in response to information from the probe operating unit, controls the operation of conveyor 106 through loader control 108 and controls the display of information on display unit 109.

Figure 2:
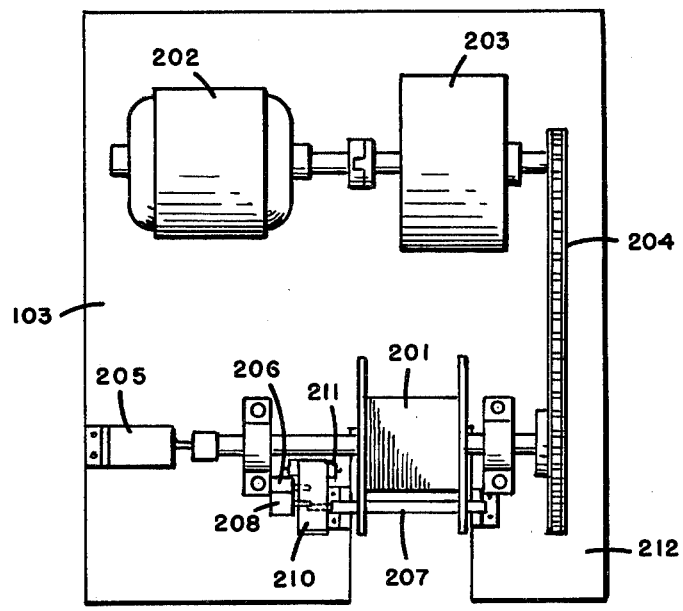
FIG. 2 is a plan view of the probe lowering and raising apparatus.
Figure 3:
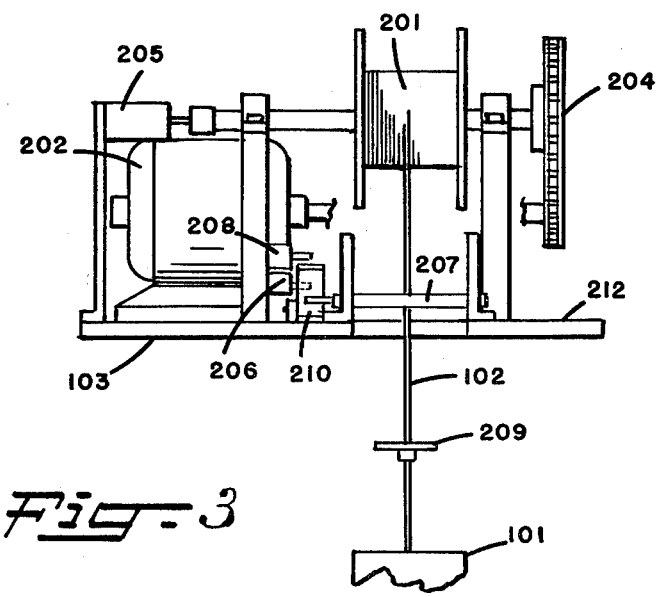
FIG. 3 is a front view of the apparatus of FIG. 2.

The probe operating unit 103 is made up (FIGS. 2 and 3) of winch drum 201 on which is wound line 102 supporting probe weight 101, winch drive motor 202 containing a solenoid operated brake (not shown), gear reducer 203 which is driven by motor 202 and in turn drives winch drum 201 through chain drive 204. Pulse generator 205 is operated on the same shaft as the winch drum and generates a number of pulses related to the number of rotations of the drum. A stop switch 206 is operated by stop bar 207 acting through member 210 hinged at point 211 to table 212 and positioned so as to be actuated, by plate 209 mounted on line 102 above the probe weight, when the weight reaches its datum point. An overtravel switch 208 is provided as a safety feature and is positioned so as to be actuated by the stop bar 207 and member 210 if for some reason the weight does not stop at its scheduled upper point. Actuation of the overtravel switch can be made to set off an alarm and to stop the winch drive motor automatically.

Figure 4:
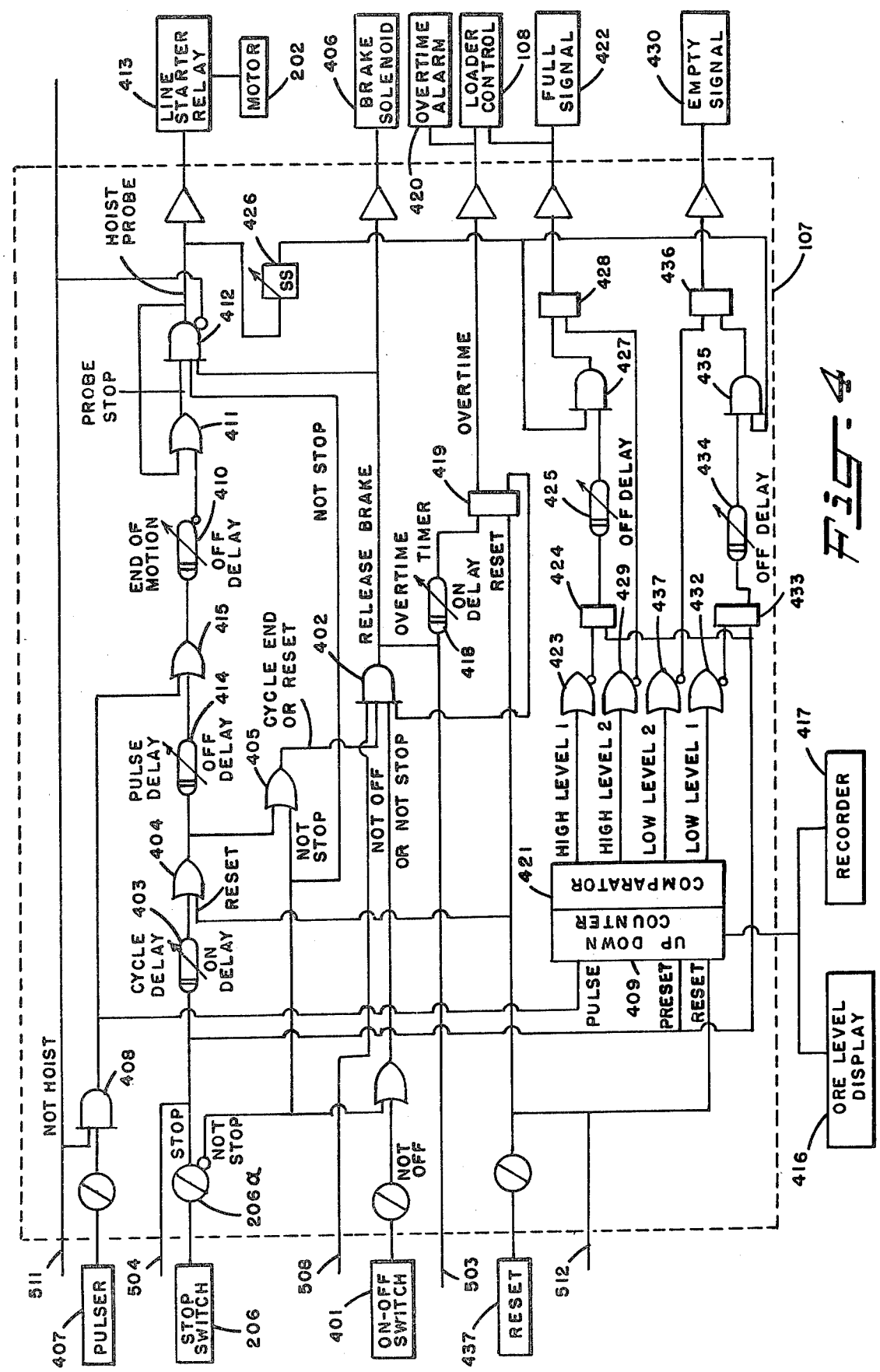
FIG. 4 is a schematic of the basic logic control circuitry for operating the device of the present invention.

The operation of the device under the control of the logic control unit 107 (FIGS. 4 and 5) is as follows. When the device is out of operation as the result of placing on-off switch 401 in the OFF condition or when, during operation, the probe weight has been retracted to its uppermost position or datum point, the probe weight 201 will be in the upper datum position in which plate 209 rests against stop bar 207 and thus maintains stop switch 206 in its STOP condition. Under either of these conditions the brake of motor 202 is set to prevent motion of winch drum 201.

In order to release the brake and start the weight down on a measurement trip, the following conditions of AND gate 402 must be met:
(1) on-off switch ON (NOT OFF) or stop switch opened (NOT STOP);
(2) end of probe rest cycle at upper position or reset;
(3) no overtime signal indicating delayed weight return;
(4) no signal indicating overtravel or malfunctioning stop switch.

If the probe weight 101 has JUST returned from a measurement trip and has just closed stop switch 206, the input to cycle delay timer 403 (on delay) goes high and the timer starts to time. OR gate 404 goes high when timer 403 times out (or when RESET button 437 is pushed). OR gate 405 then goes high, fulfilling the CYCLE END or RESET condition of AND gate 402, causing actuation of brake solenoid 406 to release the brake of motor 202. The probe weight 101 then starts to descend causing rotation of winch drum 201 and pulse generator 205. The probe weight cannot be left hanging in suspension by turning on-off switch 401 to the OFF condition because OR gate 405 has been sealed in by the NOT STOP signal from the AC input 206a associated with stop switch 206.

Pulses generated by the rotation of pulse generator 205 while probe weight 101 is falling can be passed through an adjustable pulse divider (not shown) which can be set to yield a single pulse for each convenient unit length of line unreeled from winch drum 201. The means supplying such pulses to the logic control unit are collectively shown in FIG. 4 as pulser 40.

When the probe is not being hoisted by the winch, the pulses from pulser 407 pass through AND gate 408 to up-down counter 409 for measurement of the distance the probe weight travels in its descent to the surface of the stored ore mass.

When the probe weight reaches the surface of the ore mass, its tension on the line slackens, the rotation of the winch slows and the rate at which the pulses are emitted by pulser 407 is slowed. This pulse rate slowing is detected by sending the pulses from AND gate 408 to end-of-motion timer 410 (off-delay) which is set for a timing period slightly longer than the normal time between the pulses generated by the freely falling probe weight after it has reached its full velocity of descent. The trailing edges of the pulses actuate this off delay timer. So long as a new pulse reaches the timer before it has timed out after the trailing edge of the preceding pulse, the condition of the timer will not be changed.

When, however, timer 410 times out between pulses, indicating that descent of the probe weight has stopped, NOT output of the timer goes high giving a probe stop signal through OR gate 411 to AND gate 412, the output of which actuates line starter relay 413 to start hoisting of the probe weight by motor 202. Hoist signal feedback from AND gate 412 to OR gate 411 locks in the hoist. NOT output from AND gate 412 goes low, stopping the flow of pulses through AND gate 408.

Up-down counter 409 is initially set, by the establishment of STOP condition of stop switch 206, to indicate the distance from the bottom of the bin or pile to the upper datum point of the probe. The counter is arranged to count down as the pulses are received so that, when the probe weight comes to rest on the surface of the ore mass and the pulses cease, the ore level display 416, showing the residual number in the counter, will read the ore level directly in the chosen units of length. The ore levels upon successive measurements are recorded on recorder 417.

When the descent of the probe weight first starts and its full velocity of descent has not been achieved, the resulting slow rate of pulse generation would cause timer 410 to time out. It is therefore necessary to delay the feed of pulses to timer 410 until the probe weight achieves its full rate of descent. This is accomplished by pulse delay timer 414 (off-delay), the output of which goes high when OR gate 404 goes high as the result of timing out of cycle delay timer 403 or as the result of RESET actuation. So long as timer 414 remains high, OR gate 415 remains high despite the intermittent pulses from AND gate 408.

As soon as probe weight descent starts, stop switch 206 opens, cycle delay timer 403 and OR gate 401 go low, and pulse delay timer commences to time. After its set time period, ordinarily several seconds to allow the probe weight to reach its full velocity of descent, the output of timer 410 will go low and the subsequent output of OR gate 415 will be the pulses from AND gate 408.

Overtime timer 418 (on-delay) has a time period slightly longer than the maximum time normally required for the probe weight to complete a full cycle of descent, retraction and cycle delay. Timer 418 starts to time as soon as AND gate 402 emits the release brake signal. If the release brake signal of the next cycle reaches timer 418 before it times out, the low condition of flip-flop 419 will not be changed and the not overtime condition at AND gate 402 will be maintained. If, however, the probe weight becomes buried, or if for some other reason the probe weight fails to return, timer 418 will time out causing flip-flop 419 to go high which actuates overtime alarm 420 and can cause loader control 108 to shut off the feed from conveyor 106. When the condition causing overtime has been remedied, pushing the RESET button will restore flip-flop 419 to its original condition and permit resumption of the measurement cycle.

Comparator means 421 is used to detect a full bin or pile or an excessively low ore level in the bin or pile. Two comparator settings are used for full bin indication and control and two for empty bin indication. The uppermost high level setting 1 is used to indicate the point at which ore loading is to be discontinued. The lower high level setting 2 indicates when loading is to be resumed. OR gates 423, 429, 432 and 437 from the comparator outputs are high except when the number set in the counter becomes equal to the corresponding comparator setting. Then they go low and their NOT outputs go high.

High level comparator setting 1 (uppermost) sets the depth in length units for a full bin or pile. If the number remaining in the counter 409 is higher than the number set in high level comparator setting 1, then a full signal is registered on indicator 422 and loader control 108 is actuated to stop the feed from conveyor 106. This results since the NOT output from OR gate 423, which is low, keeps NOT output from flip-flop 424 high which in turn keeps off-delay timer 425 high. When the probe hoist is enabled by AND gate 412, hoist single shot 426 is caused to send a high pulse to AND gate 427 which sets flip-flop 428 high and causes registration of a full signal on indicator 422 and stopping of the conveyor.

Since the counter will not usually stop exactly on the number corresponding to the preset high (or low) level when the probe weight comes to rest on the ore mass, off-delay timers 425 and 434 are provided to give a differential level at which the counter can stop and still give an indication of a full (or empty) condition.

If the weight stops at a point where the number in the counter is just below the high level comparator setting 1 (but not below high level comparator setting 2 at which loading resumes), NOT output of OR gate 423 is high, giving a low at the NOT output of flip-flop 424, which starts the timing of timer 425. If the timer does not time out, and go low, before the pulse from hoist single shot 426 arrives, AND gate 427 goes high with the pulse, giving or maintaining a full signal indication and stopping the conveyor or maintaining it in stopped condition. If timer 425 does time out, indicating that the probe weight has not stopped within the differential on the counter permitted by the timer, AND gate 427 will not go high and flip-flop 428 will not change state, nor will the condition of indicator 422 or the conveyor be changed.

If the probe weight stops at a point below where the counter reading is equal to high level comparator setting 2, at which loading is to be resumed, the NOT output of OR gate 429 is high, which resets flip-flop 428, canceling any full indication and reactuating the conveyor, if stopped.

There is an analogous arrangement with respect to low ore level detection and generation of an empty signal on indicator 430. Uppermost low level comparator setting 1 is higher than low level comparator setting 2. If the probe weight stops at or below the point where the number in the counter is equal to comparator setting 2, flip-flop 436 is set giving an empty indication on indicator 430. If the weight stops at a point where the number in the counter is equal to or less than low level comparator setting 1 and if off-delay timer 434 has not timed out, AND gate 435 will go high when hoist single shot 426 gives a momentary high pulse. This resets flip-flop 436 to cancel the empty signal.

If the weight stops before the number in the counter counts down to low level comparator setting 1, flip-flop 433 will stay low, giving a high signal from its NOT output to off-delay timer 434. This timer will stay high, and when hoist single shot 426 gives a high pulse to AND gate 435, flip-flop 436 will be reset to cancel the empty signal.

Flip-flops 424 and 433 are reset before each measurement trip by the STOP signal generated when stop switch 206 is closed by the return of the weight from its previous trip.

Figure 1:
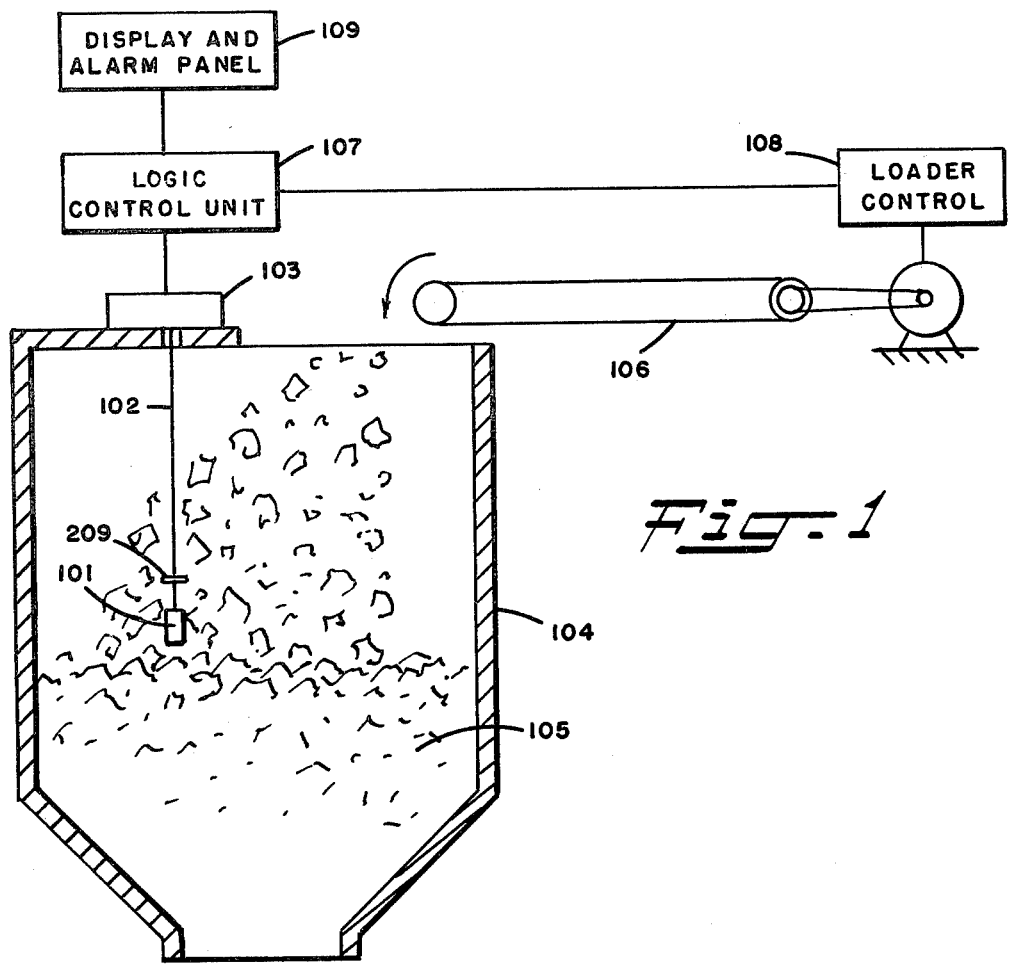
FIG. 1 is a diagrammatic front view, in section, of an ore storage bin equipped with the ore level probe of the present invention.
Figure 5:
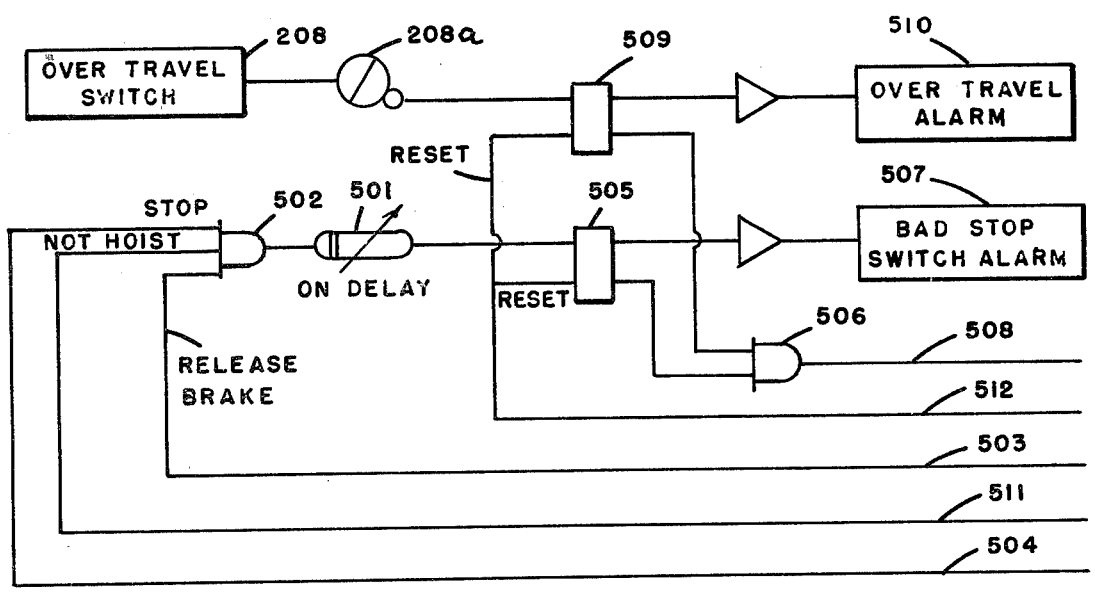
FIG. 5 is a schematic of additional logic circuitry for adding safety features to the circuit of FIG. 4.

The control arrangement of two safety features is shown in FIG. 5. The stop switch 206 is timed at the beginning of each trip to ensure that it works. Stop switch timer 501 (on-delay) starts to time as soon as AND gate 502 (already receiving a NOT HOIST signal via line 511) receives the release brake signal via line 503 from AND gate 402. If, before the timer times on, the stop switch opens, cutting off the STOP signal to AND gate 402 via line 504 and causing AND gate 402 to go low, the state of flip-flop 505 remains unchanged, giving no bad stop switch alarm and its NOT output signal continuing to be fed to AND gate 506. If, however, the timer times on before the stop switch opens, flip-flop 505 is set to actuate bad stop switch alarm 507 and to cut off its NOT signal to AND gate 506, cutting off the signal via line 508 and causing AND gate 402 to go low with the resulting reapplication of the brake on motor 202.

A check is also provided for the stop switch at the end of each trip. If the upward travel of the probe weight is not halted when the plate 209 contacts stop bar 207 and actuates the stop switch, the stop bar is raised to the point where it causes overtravel switch 208 to open. NOT output of AC input 208a then sets flip-flop 509 to actuate overtravel alarm 510 and to discontinue its NOT signal to AND gate 506, disabling AND gate 402 and preventing brake release.

Flip-flops 505 and 509 are reset via line 512 when reset button 437 is pushed.

The invention has been described with respect to the detection of high and low levels in an ore storage mass. For finer control of the feed to storage, provision can be made for a larger number of detection levels with automatic control of the rate of feed coordinated so that the lower the level of stored material, the faster the feed rate.

I claim:

1. A device for monitoring the level of ore in a storage mass upon the upper surface of which ore delivered by a conveyor falls in the form of hard, heavy fragments up to a foot or more in transverse dimension, said device comprising a weight having a mass at least substantially comparable to that of the larger ore fragments, said weight being suspended from a point above the maximum permitted ore level by a line of sufficient strength to withstand the battering of said falling ore and to lift said weight free from ore under which it becomes moderately buried in a monitoring cycle, operating means for periodically releasing said line so as to permit said weight to descend from a datum point above said maximum permitted ore level to the surface of said storage mass and for retracting said line, as soon as the weight reaches said surface, until the weight has been returned to said datum point, measuring means for measuring the distance traveled by said weight each time in its descent from the datum point to the storage mass surface, said measuring means comprising a pulser which generates an electrical pulse for each unit distance the weight descends from its datum point until it reaches the surface of the stored ore mass and a counter which counts said pulses and displays a number correlated to the level in distance units of the stored ore mass, and detection and control means for detecting the point at which said descending weight has reached said storage mass surface and for initiating said retraction, said detection and control means comrising a timer having a timer period set for slightly longer than the time interval between said pulses when the weight is freely falling in its descent and means for detecting when the interval between said pulses exceeds said time period, indicating that the weight has reduced its rate of descent by coming to rest on the stored ore mass.

2. A device according to claim 1 including a timer having a time period set for the normal maximum time for the weight to complete its cycle of descent and retraction and means for actuating an alarm when the weight has failed to complete its cycle within said time, indicating entrapment of the weight by burial in delivered ore.

3. A device for monitoring the level of ore in a storage mass upon the upper surface of which ore delivered by a conveyor falls in the form of hard, heavy fragments up to a foot or more in transverse dimension, said device comprising a weight having a mass at least substantially comparable to that of the larger ore fragments, said weight being suspended from a point above the maximum permitted ore level by a line of sufficient strength to withstand the battering of said falling ore and to lift said weight free from ore under which it becomes moderately buried in a monitoring cycle, operating means for periodically releasing said line so as to permit said weight to descend from a datum point above said maximum permitted ore level to the surface of said storage mass and for retracting said line, as soon as the weight reaches said surface, until the weight has been returned to said datum point, detection and control means for detecting the point at which said descending weight has reached said storage mass surface and for initiating said reaction, measuring means for measuring the distance traveled by said weight each time in its descent from the datum point to the storage mass surface, a timer having a time period set for the normal maximum time for the weight to complete its cycle of descent and retraction, and means for actuating an alarm when the weight has failed to complete its cycle within said time, indicating entrapment of the weight by burial in delivered ore.

4. A device for monitoring the level of ore in a storage mass upon the upper surface of which ore delivered by a conveyor falls in the form of hard, heavy fragments up to a foot or more in transverse dimension, said device comprising a weight having a mass at least substantially comparable to that of the larger ore fragments, said weight being suspended from a point above the maximum permitted ore level by a line of sufficient strength to withstand the battering of said falling ore and to lift said weight free from ore under which it becomes moderately buried in a monitoring cycle, operating means for periodically releasing said line so as to permit said weight to descend from a datum point above said maximum permitted ore level to the surface of said storage mass and for retracting said line, as soon as the weight reaches said surface, until the weight has been returned to said datum point, detection and control means for detecting the point at which said descending weight has reached said storage mass surface and for initiating said reaction, measuring means for measuring the distance traveled by said weight each time in its descent from the datum point to the storage mass surface, said measuring means comprising a pulser which generates an electrical pulse for each unit distance the weight descends from its datum point until it reaches the surface of the stored ore mass and a counter which counts said pulses and displays a number correlated to the level in distance units of the stored ore mass, first comparator means set at a number correlated with the number of distance units in the maximum permitted ore level, second comparator means set at a number similarly correlated with the number of distance units in a second ore level below said maximum permitted level, means for automatically causing or maintaining cessation of ore delivery by said conveyor if at the time the weight stops its descent the number in counter indicates an ore level equal to or higher than does the number in the first comparator, means for automatically causing resumption of or maintaining ore delivery by the conveyor if, at the time the weight stops its descent, the number in the counter indicates an ore level equal to or lower than does the number in the second comparator, and a differential ore level indication for halting ore delivery including a timer set at a time period less than the time required for the weight to fall between said maximum permitted ore level and said second ore level, means for starting said timer when the descent of the weight causes the number in the counter to reach the number in the first comparator means, and means for halting delivery of ore thereafter only if the weight stops its descent before the expiration of said time period.

5. A device for monitoring the level of ore in a storage mass upon the upper surface of which ore delivered by a conveyor falls in the form of hard, heavy fragments up to a foot or more in transverse dimension, said device comprising a weight having a mass at least substantially comparable to that of the larger ore fragments, said weight being suspended from a point above the maximum permitted ore level by a line of sufficient strength to withstand the battering of said falling ore and to lift said weight free from ore under which it becomes moderately buried in a monitoring cycle, operating means for periodically releasing said line so as to permit said weight to descend from a datum point above said maximum permitted ore level to the surface of said storage mass and for retracting said line, as soon as the weight reaches said surface, until the weight has been returned to said datum point, said operating means comprising a motorized winch upon which said line is wound and means for braking, releasing and rewinding said winch in response to the detected position of said weight with respect to the datum point and to the surface of the storage mass, measuring means for measuring the distance traveled by said weight each time in its descent from the datum point to the storage mass surface, said measuring means comprising pulse means for emitting successive electrical pulses in fixed relation to the angular rotation of the winch and counting means for registering the number of said emitted pulses, and detection and control means for detecting the point at which said descending weight has reached said storage mass surface and for initiating said retraction, said detection and control means comprising a timer having a time period set for slightly more than the usual time interval between said pulses when the weight is freely falling in its descent, means for detecting when the interval between pulses exceeds said time period, indicating that the weight has come to rest on the storage mass and reduced its pull on the winch, and means for thereupon instituting rewinding of the winch to retract the weight.

6. A device for monitoring the level of a storage mass, said device comprising a weight suspended by a line from a point above the maximum permitted level of said mass, means for releasing said line so as to permit said weight to descend from a datum point above said maximum permitted level to the surface of said storage mass, a pulser which generates an electrical pulse for each unit distance the weight descends from the datum point until it reaches the surface of the stored mass, and means for detecting the point at which said descending weight has reached said storage mass surface comprising a timer set for slightly more than the usual time interval between said pulses when the weight is freely falling in its descent and means for detecting when the interval between pulses exceeds said time period, indicating that the weight has reduced its rate of descent by coming to rest on the surface of the mass.

7. A device for monitoring the level of a storage mass, said device comprising a weight suspended by a line from a point above the maximum permitted level of said mass, means for releasing said line so as to permit said weight to descend from a datum point above said maximum permitted level to the surface of said storage mass, counter means for counting the unit distances the weight descends from the datum point, comparator means set at a number corresponding to the number appearing in the counter when the weight reaches said maximum permitted level, a timer set for a time period for the weight to fall only a short distance below said maximum permitted level, means for starting the timer when the descent of the weight causes the number in the counter means to reach the number in the comparator means and means for actuating an indication that the maximum permitted ore level has been reached only if the weight stops its descent before the expiration of said time period.

* * * * *